J. H. BEIDLER.
Lamp.
No. 55,806.
Patented June 26, 1866.
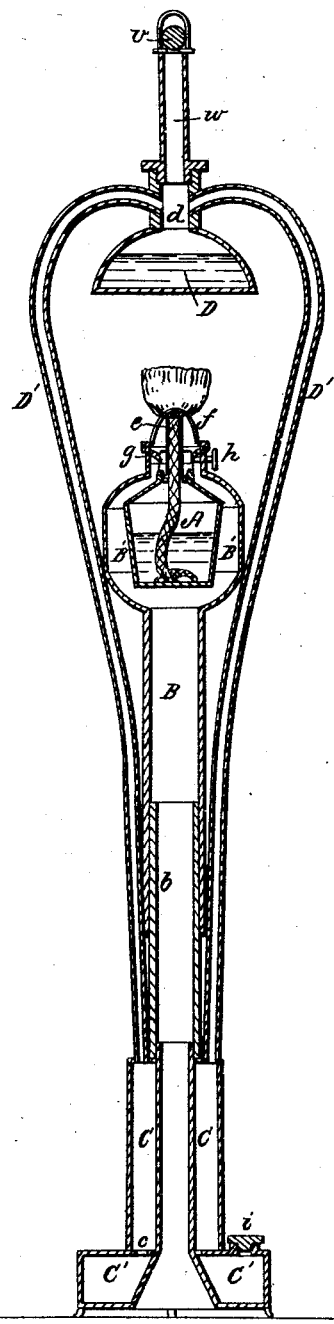
Witnesses:
J. J. Coombs
John Coon
Inventor:
Jacob H. Beidler

UNITED STATES PATENT OFFICE.

JACOB H. BEIDLER, OF LINCOLN, ILLINOIS.

IMPROVEMENT IN LAMPS.

Specification forming part of Letters Patent No. 55,806, dated June 26, 1866.

*To all whom it may concern:*

Be it known that I, JACOB H. BEIDLER, of Lincoln, Logan county, in the State of Illinois, have invented a new and useful Improved Lamp for Illuminating Purposes, which I denominate "Beidler's Hydro-Caloric Light;" and I do hereby declare that the following is a full and exact description thereof, reference being had to the accompanying drawing, and to the letters of reference marked thereon.

The object of my invention is to produce a lamp which will burn kerosene and other similar oils without the use of a glass chimney, effecting perfect combustion without smoke, and producing a clear, white, steady flame.

The nature of my invention consists in feeding the flame with a sufficient supply of oxygen to cause perfect combustion by means of a current of atmospheric air from below, induced by means of steam generated by the illuminating-flame.

In the accompanying drawing is shown a vertical section of a lamp constructed in accordance with my invention.

A is the oil-cup; $e$, the wick-tube; $f$, the cone or dome deflector; $g$, a perforated plate through which the air to feed the flame passes; and $h$ is a wheel for turning the ratchet to raise and lower the wick.

B is a tube through which the current of air to feed the flame is conducted from the base of the lamp-stand, and B' is an annular chamber in which the oil-cup is suspended, and through which the air to feed the flame passes from the said tube B, entering the cone or dome deflector through the perforated plate $g$.

C is an annular steam-chamber around the lower portion of the tube B, which communicates heat to the interior of said tube, and thus induces an upward current of air through it.

C' is a hot-water tank, surrounding the base of the air-tube B, and connecting with the chamber C by means of a small aperture, $c$.

D is a water-boiler, located above the illuminating-flame and receiving heat from it.

D' D' are two steam-pipes for conducting the steam generated in the boiler D to the annular steam-chamber C.

$d$ is a steam-chamber connected with the boiler, from which the steam is conducted by the pipes D' D', and $v$ is an escape-valve mounted on an escape-tube, $w$, which is screwed to the steam-chamber $d$.

The tube B has a telescope-joint, (shown at $b$,) by means of which the illuminating-flame may be adjusted at a suitable distance from the boiler.

The operation is as follows: The lamp being supplied with oil and properly trimmed, some hot water is introduced into the chamber C' through the aperture closed by the screw-tap $i$. At the same time a supply of water must be introduced into the boiler by unscrewing the escape-pipe $w$. The hot water in the chamber C' communicates heat to the air-tube B, and causes an ascending current of air through the same. The lamp then being lighted, immediately communicates heat to the boiler D, and generates steam therein, which passes down the tubes D' D' to the annular chamber C, and keeps up a sufficient degree of heat therein to cause a continuous and steady ascending current of air through the tube B, which air is fed to the flame through the perforated plate $g$ and the deflector $f$. This constant supply of fresh air to the flame causes perfect combustion, producing a clear, white, and steady flame, and obviating the necessity of a glass chimney. Any water formed in chamber C by condensation will pass into the chamber C' through the aperture $c$.

Having thus fully described my invention, and the mode of carrying it into effect, what I claim as new, and desire to secure by Letters Patent, is—

1. The method herein described of creating an ascending current of air to feed the flame by means of steam generated by the caloric emanating from the illuminating-flame of the lamp.

2. The combination of the boiler or heater D, the steam-pipes D' D', the annular chamber C, and the feed-tube B, with the oil-cup A, perforated plate $g$, and deflector $f$, as and for the purpose described.

3. The hot-water tank C', in combination with the feed-tube B and the boiler or heater D, as and for the purposes described.

JACOB H. BEIDLER.

Witnesses:
J. J. COOMBS,
JOHN COON.